Oct. 23, 1951     H. H. WITTENBERG     2,572,292
PROTECTIVE SYSTEM
Filed May 3, 1946
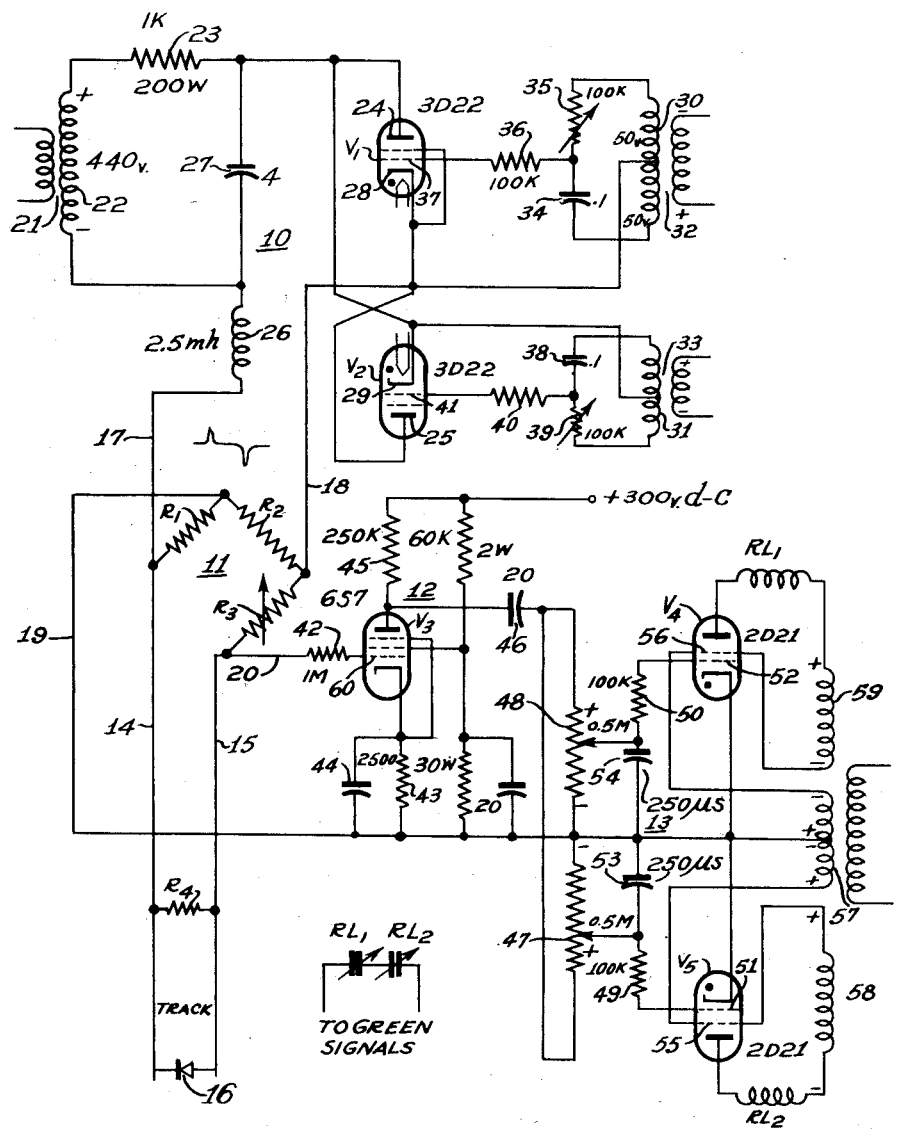
INVENTOR.
Hubert H. Wittenberg
BY
Attorney Patented Oct. 23, 1951

2,572,292

UNITED STATES PATENT OFFICE 2,572,292

PROTECTIVE SYSTEM

Hubert H. Wittenberg, Lancaster, Pa., assignor to Radio Corporation of America, a corporation of Delaware Application May 3, 1946, Serial No. 666,977

2 Claims. (Cl. 175—294)

This invention relates to protective systems such as are designed to produce an effect in response to values of impedance which are outside the range of resistances or impedances normally existing between one end of the rails of a section of railroad or the like. One protective system of this character is disclosed by my copending application Serial No. 631,723 filed November 29, 1945, now Patent No. 2,460,160. The present invention is an improvement on the invention of the aforesaid application in that it operates with greater precision to provide a danger signal when the impedance between one end of the rails or conductors decreases below its normal range of values or when such resistance or impedance exceeds its normal range.

It is well known that the impedance between the rails of a railway section or crossover varies from a relatively high value approaching infinity in dry weather to a relatively low value in wet weather. This variation in impedance is herein designated as the "normal range" of the impedance or resistance between the rails. When such impedance assumes an abnormal value, it is desirable that this condition be indicated immediately by a danger signal such as a red light.

It is obvious however that if a break occurs in the rails a device placed at one end would not be able to detect an abnormal impedance beyond the break. In order to care for this contingency a rectifier is placed at the far end of the block in question, just as in my application Serial No. 631,723. To voltage of such a polarity as to make a current flow in a forward direction through the rectifier the impedance appears as a very low value. This is also a normal value. Hence there is an abnormal range of impedances having an upper and lower limit which is monitored by the invention about to be described.

In accordance with one modification of the present invention, this result is achieved by a protective system including a bridge circuit which (1) has as the unknown arm the rails of the railway section which are interconnected at their far end through a unilateral impedance such as a rectifier, (2) has applied to its input terminals an alternating potential of peaked wave form, and (3) has an indicator connected to its output terminals consisting of a vacuum tube circuit which includes a single tube stage followed by a stage including a pair of thyratrons connected in push-pull relationship.

As is well known in the art, impedances in the unknown arm of a bridge above the balance value produce a negative output voltage say, when the input voltage is positive and conversely, unknown impedances below the balance value produce a negative output voltage when the input voltage is negative. My invention utilizes the first of these unbalanced conditions to check for normal impedances or a clear track, and the second to check for below abnormal or continuity of the rails through an artificial short in the form of the rectifier. The indicator is sensitive only to negative signals and if either negative signal disappears the indicator is deenergized and a danger signal appears. The use of an alternating current of peaked wave form has the advantage that the positive and negative testing peaks are spaced from one another so that more sensitive operation of the apparatus is realized and the average rectified current is restricted to a value sufficiently low to prevent overheating of the rectifier.

Important objects of the present invention are to provide an improved protective system and method of operation which make available a greater degree of precision than that heretofore realized in connection with systems designed to produce a signal in response to impedance values outside a predetermined normal range.

The invention will be better understood from the following description considered in connection with the accompanying drawings and its scope is indicated by the appended claims.

The single figure illustrates the form of the invention which is outlined above.

This form of the invention includes a source 10 of alternating potential having a peaked wave form, a bridge 11, a single stage 12 and an output push-pull stage 13.

The bridge circuit includes three resistors $R_1$, $R_2$ and $R_3$ and a pair of rails or conductors 14 and 15 which are interconnected at their far ends through a rectifier 16 and have between them an impedance $R_4$ which varies over a predetermined normal range. The alternating potential of peaked wave form is applied to the bridge 11 through one pair of leads 17 and 18 and potential resulting from change in the unbalance of the bridge is applied through leads 19 and 20 to the input circuit of the single stage 12.

The alternating potential of peaked wave form is derived from a sixty cycle input transformer 21 which has one terminal of its secondary winding 22 connected through a resistor 23 to the anode 24 and cathode 29 of the electron discharge devices $V_4$ and $V_2$ and has the other terminal of this secondary winding 22 connected through an inductor 26 to the lead 17 of the bridge 11. The secondary winding 22 and resistor 23 are shunted by a capacitor 27. The cathode 28 and anode 25 of the devices $V_1$ and $V_2$ are connected to the lead 18. The input circuits for $V_1$ and $V_2$ and well known phase shifting circuits connected as follows: The midpoint terminals of the secondary windings 30 and 31 of a pair of transformers 32 and 33 are connected respectively to the cathodes 28 and 29 of devices $V_1$ and $V_2$. From the secondary winding 30, alternating potential is applied through a capacitor 34 and resistors 35 and 36 to the grid 37 of the gaseous discharge device $V_1$. Similarly from the winding 31, alternating potential is applied through a capacitor 38 and resistors 39 and 40 to the grid 41 of the gaseous discharge device $V_2$.

The phase relation between the alternating potentials applied to the grids 37 and 41, and the corresponding anodes 24 and 25 is such that the device $V_1$ conducts current only during a predetermined part of the positive half cycle of the sixty cycle input and the device $V_2$ conducts current only during a predetermined part of the negative half cycle of the sixty cycle input. As $V_1$ begins conduction capacitor 27 discharges through the series combination of $V_1$, inductance 26, and the bridge. A large pulse of current flows through this series circuit since the bridge resistance is small. Following this pulse there is a small current, as determined by the relative large resistor 23, that flows until the A.-C. potential from secondary 22 passes through zero. Device $V_2$ and its associated circuit operate in a similar manner to produce a negative pulse 180° later.

The single stage 12 includes an electron discharge device $V_3$ having an input circuit which includes the bridge 11, a grid resistor 42 and a cathode bias resistor 43 which is shunted by an alternating current bypass capacitor 44. The output circuit of the device $V_3$ includes an anode resistor 45 and the resistor 43.

From the anode terminal of the resistor 45, a potential dependent on the current of the device $V_3$ is applied through a coupling capacitor 46, resistors 47 and 48, and resistors 49 and 50 to the grids 51 and 52 of the push-pull connected gaseous discharge devices $V_4$ and $V_5$. It will be noted (1) that the resistors 47 and 48 are partly shunted by bypass capacitors 53 and 54, (2) that alternating bias potential is applied to the shield grids 55 and 56 of the devices $V_5$ and $V_4$ from a secondary winding 57, (3) that the output circuit of the device $V_5$ includes a relay winding $RL_2$, a secondary winding 58, the shield grid 55 and the lower half of the winding 57, and (4) that the output circuit of the device $V_4$ includes a relay winding $RL_1$, a secondary 59, the shield grid 56 and the upper half of the winding 57. The polarities of the windings 37, 58 and 59 are such that the shield grid and anode potentials of the devices $V_4$ and $V_5$ are opposed. The relays $RL_1$ and $RL_2$ are related in a well known manner so that deenergization of either of them produces a signal indicating the existence of an abnormal impedance between the monitored ends of the conductors 14 and 15.

Under these conditions, both relays are energized so long as the monitored impedance $R_4$ remains within its normal range. When the impedance $R_4$ becomes lower than the lower limit of its normal range and the terminal 18 is negative, the bridge more nearly balances and a less negative potential is applied to the control grid 60 of the device $V_3$ which takes more current and applies to the grids 51 and 52 a more negative potential whereby the device $V_4$ and the relay $RL_1$ are deenergized. When a crack or break occurs in the rails, the rectifier 16 is not able to present its normal low impedance to the positive pulse on terminal 18: at the next positive peak (terminal 18 positive) the bridge balances or unbalances in the other direction giving a more positive signal to $V_3$. As a result $V_5$ and its relay $RL_2$ are deenergized.

The outstanding characteristic of the present invention is the provision of a bridge network which functions in response to an alternating potential of peaked wave form with a high degree of precision to produce a signal when the impedance between two conductors varies outside its normal range.

I claim as my invention:

1. The combination of a pair of conductors interconnected through a leakage impedance having a normal range of variation, a bridge circuit having a pair of input and a pair of output terminals respectively across different diagonals of the bridge and having one of its arms connected to said conductors at one of their ends, means for applying an alternating potential to said input terminals, means connected between said conductors at the other of their ends for presenting a relatively low impedance to potential of one polarity and a relatively high impedance to potential of the opposite polarity, means for deriving from said output terminals a control potential which increases in one polarity sense in one condition of input polarity when said leakage impedance decreases below the lower limit of its normal range of variation, and which increases in the same said polarity sense in another condition of input polarity when said impedance exceeds the upper limit of its normal range, due to the bridge reversing polarity characteristic for these different conditions, and means responsive to said control potentials when and only when said control potential increases in said one polarity sense beyond predetermined values.

2. The combination claimed in claim 1, said alternating potential being of peaked wave form.

HUBERT H. WITTENBERG.

REFERENCES CITED

The following references are of record in the file of this patent:

UNITED STATES PATENTS

| Number | Name | Date |
| --- | --- | --- |
| 1,765,715 | Byers | June 24, 1930 |
| 1,824,128 | Duffy et al. | Sept. 22, 1931 |
| 1,951,461 | Wilson | Mar. 20, 1934 |
| 1,969,059 | Bodde | Aug. 7, 1934 |
| 2,083,920 | Powell | June 15, 1937 |
| 2,095,684 | Witmer et al. | Oct. 12, 1937 |
| 2,098,041 | Hoppe | Nov. 2, 1937 |
| 2,123,966 | Rees | July 19, 1938 |
| 2,182,163 | Place | Dec. 5, 1939 |
| 2,290,446 | Pflasterer | July 21, 1942 |
| 2,366,500 | Eastin | Jan. 2, 1945 |
| 2,418,869 | Copley | Apr. 15, 1947 |
| 2,420,578 | Wilson | May 13, 1947 |
| 2,466,746 | Shive | Apr. 12, 1949 |
| 2,467,856 | Rich | Apr. 19, 1949 |
| 2,484,342 | Hart | Oct. 11, 1949 |

OTHER REFERENCES

Taylor, abstract of application 627,733, published Sept. 5, 1950, O. G. vol. 638.